United States Patent [19]
Marin et al.

[11] Patent Number: 5,735,456
[45] Date of Patent: Apr. 7, 1998

[54] UNIVERSAL RETROFIT VALVE ACTUATOR AND SYSTEM

[75] Inventors: Jonathan K. Marin, Brooklyn, N.Y.; James R. Pope, Cambridge, Mass.; Richard C. Steele, Warwick, R.I.; Ronald R. Bilodeau, Jr., Mattapoisett, Mass.

[73] Assignee: The Steam-O-Stat Company, R.I.

[21] Appl. No.: 301,950

[22] Filed: Sep. 7, 1994

[51] Int. Cl.$^6$ .................... F16H 1/18; G05D 15/00
[52] U.S. Cl. .............. 236/75; 236/91; 74/424.8 V; 74/424.8 A; 251/129.03
[58] Field of Search .............. 251/129.03, 129.11; 236/78 C, 75, 91; 74/424.8 V, 424.8 A

[56] References Cited

U.S. PATENT DOCUMENTS

| | | | |
|---|---|---|---|
| 2,452,428 | 10/1948 | Bryant | 74/424.8 VA X |
| 2,902,885 | 9/1959 | Wright | 251/129.03 X |
| 2,977,437 | 3/1961 | Doane | 200/81.9 |
| 2,997,437 | 8/1961 | Whitaker | 204/209 |
| 3,387,748 | 6/1968 | Brenchley | 251/129.11 X |
| 3,703,673 | 11/1972 | Balz | 318/468 |
| 3,703,763 | 11/1972 | Berry | 29/503 |
| 3,908,959 | 9/1975 | Fichtner | 251/129.11 |
| 4,097,786 | 6/1978 | Lund | 251/129.11 X |
| 4,754,949 | 7/1988 | Fukamachi | 251/129.03 |
| 4,889,315 | 12/1989 | Imanaga | 251/129.03 |
| 4,899,315 | 2/1990 | Imanaga | 251/129.03 |
| 5,025,826 | 6/1991 | Schoepe et al. | 137/315 |
| 5,152,316 | 10/1992 | Dorr | 137/487.5 |
| 5,156,373 | 10/1992 | Boyles et al. | 251/129.12 |

OTHER PUBLICATIONS

Honeywell ML984 VERSADRIVE Integrated Valve Actuator, Form #95C–10513 1988 05 PC/GLS, Honeywell, 740 Elsmere Road, Scarborough, Ontario M1P 2V9, Canada.
Instruction Sheet 102–051, Form H92–051 for Heat–Gard Thermostatic Valves from Taco, Inc. of 1160 Cranston Street, Cranston, RI 02920.

*Primary Examiner*—William E. Wayner
*Attorney, Agent, or Firm*—Perman & Green, LLP

[57] ABSTRACT

An actuator has a drive gear set to interact with a driven lug to rotate the lug and whatever the lug is fixed to. The actuator must be separately anchored to interact with the lug. The drive gear and the lug have cams that are spaced apart, so that when the lug is fixed to an object which is off its linear axis, there is play in the gear relationship to allow rotation to function. In a system with an actuator, such as a thermostat, temperature can be controlled by turning a valve on a radiator on and off. End of travel is sensed by a current surge stopping the acutation. The system is ideal to operate radiators in a steam heat system.

18 Claims, 10 Drawing Sheets

UNIVERSAL RETROFIT VALVE ACTUATOR AND SYSTEM

BACKGROUND OF THE INVENTION

The present invention is a universal retrofit valve actuator and system. The system is particularly adapted for use in steam heat regulating systems with a remote thermostat.

In existing steam heating systems it is difficult, dangerous and in many jurisdictions, illegal to repair or replace a valve while the system is operating. In large installations, whole heating systems have to be shut down, in order to make any repair that opens the system even for only one valve. Repairs cannot be tested when the system is not working. Thus, repair or installation requires at least two sessions and the expenses attendent thereto. The expense includes the cost of experienced technicians, plumbers for each session.

In large buildings, hotels, office buildings, and factories, valve repair or setting up temperature regulators is an onerous scheduling and project management problem fraught with delay. There may also be seasonal problems during a cold winter. Valves or pipes may break when worked with. The valves are difficult or impossible to duplicate and the piping is expensive and inconvenient to repair if damaged.

Most buildings with steam heating systems of the past have mixes of different valves. In the prior art, installing temperature regulators oftentimes required surveys in order to to accommodate the different parts needed in order to retrofit the valves or valve regulating systems in a heating system.

Prior art systems have been provided to be installed to actuate valves. Such systems have even been provided with thermostatic regulating means to control temperature. The systems have required specific matches to various valve configurations, and the thermostatic controls are usually at the valve, as distinguished from an appropriate place in a room. Remote thermostatic systems with capillary tubes actuating the valve are easily damaged and sluggish in operation.

There is an almost infinite set of problems to be faced in the universe of repair or regulating existing valves in a steam heat system. There are different size valves, valve stems and handle means. The prior art had to supply an infinitude of actuating systems to actuate the different size valves and regulate the temperature.

Some prior art heat regulating systems are easily broken or misaligned and depend upon mechanical position indication. The mechanical positioning of the valve settings in existing thermostatic heat systems of the prior art renders them prone to installation error and post installation misalignment. The delicate temperature sensors are close to the heat source.

In steam heat systems, valves work best with the valves either fully open, or fully closed. Incompletely closed or open valves may cause leakage of steam and/or formation and dripping of condensate. Incompletely closed or open valves are also a cause of the proverbial banging radiator. Leaking also can be a result of this problem.

In prior art steam heat systems, the valve stems usually have combinations of internal threads at their ends and/or round or square ends no receive various types of valve handles. Old valves may be bent, twisted or misaligned. The present invention provides a system for a single valve actuator to adapt to almost all valve stem states and sizes and be installable without skilled labor, independent of whether a heat system is operating or not.

DESCRIPTION OF THE RELATED ART

Annexed hereto is Form PTO-1449 and copies of the patents and prior art cited therein.

A typical prior art retrofit valve actuating temperature regulating system is the Honeywell ML984A VERSADRIVE™ Integrated Valve Actuator, a five page specification for which, Form #95C-10513 1988 05 PCY/GLS, from Honeywell, 740 Elsmere Road, Scarborough, Ontario M1P 2V9, Canada, describes a self contained, self adjusting linear motor linkage that mounts directly onto one half inch through three inch V5011 two way, or V5011 three way valves. The control is obtained from a motor with a step down transformer and has thermostatic control ambiently regulated from 32™F to 130™F.

A typical prior art regulating valve for a steam installation, according to Instruction Sheet 102-051, Form H92-051, effective Jan. 1, 1986, consisting of four pages, are the Heat-Gard™ Thermostatic Valves from Taco, Inc. of 1160 Cranston Street, Cranston, R.I. 02920. With regard to Heat-Gard theromstatic valves, operating models and valve models 5201-2, 5201-2, 5203-2, 5204-2 and valves 5221-1, 5222-1, 5223-1, 5227-1, 5228-1, 5229-1, 5231-1, 5232-1, 5233-1, 5234-1, 5237-1, 5239-1, 5241-1, 42-1, 5243-1, 5251-1, 5252-1, 5253-1, the Taco Heat-Gard™ valve is an inline replacement steam valve with a remote temperature sensor that actuates the valve by capillary action.

U.S. Pat. No. 2,997,437 discloses a motor actuated valve system for controlling vanes or dampers in heat systems, where the motor controls are driven by an arrangement about the motor driven shaft so that they are easily accessible for making necessary electrical connections.

U.S. Pat. No 3,703,763 discloses an axial motor driven spindle of an element upon rotation of the spindle guided by a sleeve for the connection with a positioning of valve elements in valve seats.

U.S. Pat. No 4,754,949 discloses a motor actuated valve system with a speed reduction mechanism incorporating internal gears. The motor actuator for the valve has no brake mechanism as the drive means includes a worm gear with external peripheral teeth meshed.

U.S. Pat. No 4,889,315 discloses a sensor and motor actuate system for the opening and closing of valves for discharge of water.

U.S. Pat. No 5,025,826 discloses a replacement handle system for a valve stem with a pair of jaws and camming surfaces and handle to engage the valve stem.

U.S. Pat. No 5,152,316 discloses a servo system for opening and closing valves responsive to various pressure situations.

U.S. Pat. No. 5,156,373 discloses a remotely controlled motor means with remote energization of a motor to rotate a valve stem.

It is respectfully requested that this citation of art be made of record with regard to the within application.

SUMMARY OF THE INVENTION

The present invention is a universal retrofit valve actuator and system for use in the remote actuation of valves. When the actuating valves are in a heating system, the actuation ordinarily is by way of a signal from a thermostat.

In a preferred embodiment, the retrofit actuator is engaged to a valve stem in a steam heat systems, actuated by a remote thermostat.

Actuation of the valves is totally electronic and self aligning at each on and off cycle. No expensive skilled labor is required to install.

The present invention can accommodate an arbitrary wide range of valve stem diameters and total travel distances, open to close, turns per inch, number of turns open to close, bonnet nut lengths and diameters and stems in bent and twisted or crooked condition. Insofar as understood, prior art retrofits only work on perfect, or nearly perfect stems.

No survey nor shutdown is required to retrofit the valve actuators of the present invention.

Valves may be actuated remotely with or without thermostatic initialization.

The remote valve actuating system of the present invention and the thermostatic actuation is able to heat at the full open or closed positions of the valve.

According to the present invention, a valve actuator is in a system for driving a valve stem to open or close a valve. An actuator is anchorable apposed to the valve stem. The actuator drives a rotatable drive gear. The drive gear has at least one cam having an extending length. The cam has two driving surfaces. There is a lug with at least one cam having a first and second driven surface. The lug is fixed to rotate the valve stem. The drive cam is engagable with the driven cam when the actuator is anchored. The driven cam is engagable along the drive cam's extending length. The drive cam and driven cam's first surfaces engage to rotate the lug in one direction, the drive cam and driven cam's second surfaces engage to rotate the lug in reverse. The respective surfaces of the drive cam and driven cam are spaced apart from each other, and when not engaged, have ample play to allow for eccentric rotation of the valve stem.

The actuator may have a bottom portion open to the valve stem. The periphery of the bottom portion may have at least one slotted opening, including a lock notch.

The actuator may be anchorable to the valve body or a bonnet nut on the valve. A centering cap may be anchorable to the bonnet nut with the actuator anchored to the centering cap. The centering cap may be anchored to the bonnet nut by more than one centering screw. The actuator may have anchoring screws.

The drive gear may be driven by an electric motor, having a gear train, including reduction gears and a warm gear. The drive gear may be cylindrical and have peripheral teeth and an internal drive cam extending longitudinally substantially the length of the cylinder. The drive gear may have at least one ball bearing race and ball bearings in the bearing race.

The drive gear may have a base and at least one drive cam extending from the base.

The lug may have a central opening for a screw to fix the lug to the valve stem, or a partial central opening, to engage the valve stem. There may be another opening to the central opening for a set screw. The central opening may be tapered.

The actuator may be in a system, driven by a DC electric motor to drive the drive gear. The motor has an on and off state and may operate forward or backward. The system includes integrated circuitry, to energize it. The integrated circuitry can sense temperature and measure motor current. The temperature sensing can be set, to set points of selected temperature readings and actuate a change of the motor's state, when the surrounding temperature reaches the selected temperature reading. The motor current measure also has a set point above a threshold of normal operating current, to sense a surge in the load, such as encountered when a valve stem reaches its limit of travel opening or closing. At such point, the system signals the motor to change to an off state and to also reverse the polarity of current to the motor. The polarity reversal is sequenced to change with the off state or to change before the next the on state.

The system may have a housing to hold the integrated circuitry and a display window. The display window can display time information and temperature information. There are control buttons to adjust both time in the circuitry and temperature settings. The integrated circuitry is interfaced with the display window, and the control buttons with the integrated circuitry, and means to interface the control buttons with the display window.

In a system to drive a DC electric motor, the motor has an on and off state and may operate forward or backward. The system includes integrated circuitry to energize it. The integrated circuitry can sense temperature and measure motor current. The temperature sensing can be set to set points of selected temperature readings and actuate a change of the motor's state when the surrounding temperature reaches the selected temperature reading. The motor current measure also has a set point above a threshold of normal operating current to sense a surge in the load such as such as an overload. At such point the system signals the motor to change to an off state and to also reverse the polarity of current to the motor. The polarity reversal is sequenced to change with the off state or to change before the next the on state.

Although such novel feature or features believed to be characteristic of the invention are pointed out in the claims, the invention and the manner in which it may be carried out, may be further understood by reference to the description following and the accompanying drawing.

BRIEF DESCRIPTION OF THE DRAWING

Referring now to the figures in greater detail, where like reference numbers denote like parts in the various figures.

DESCRIPTION OF THE PREFERRED EMBODIMENTS

Figure 1:
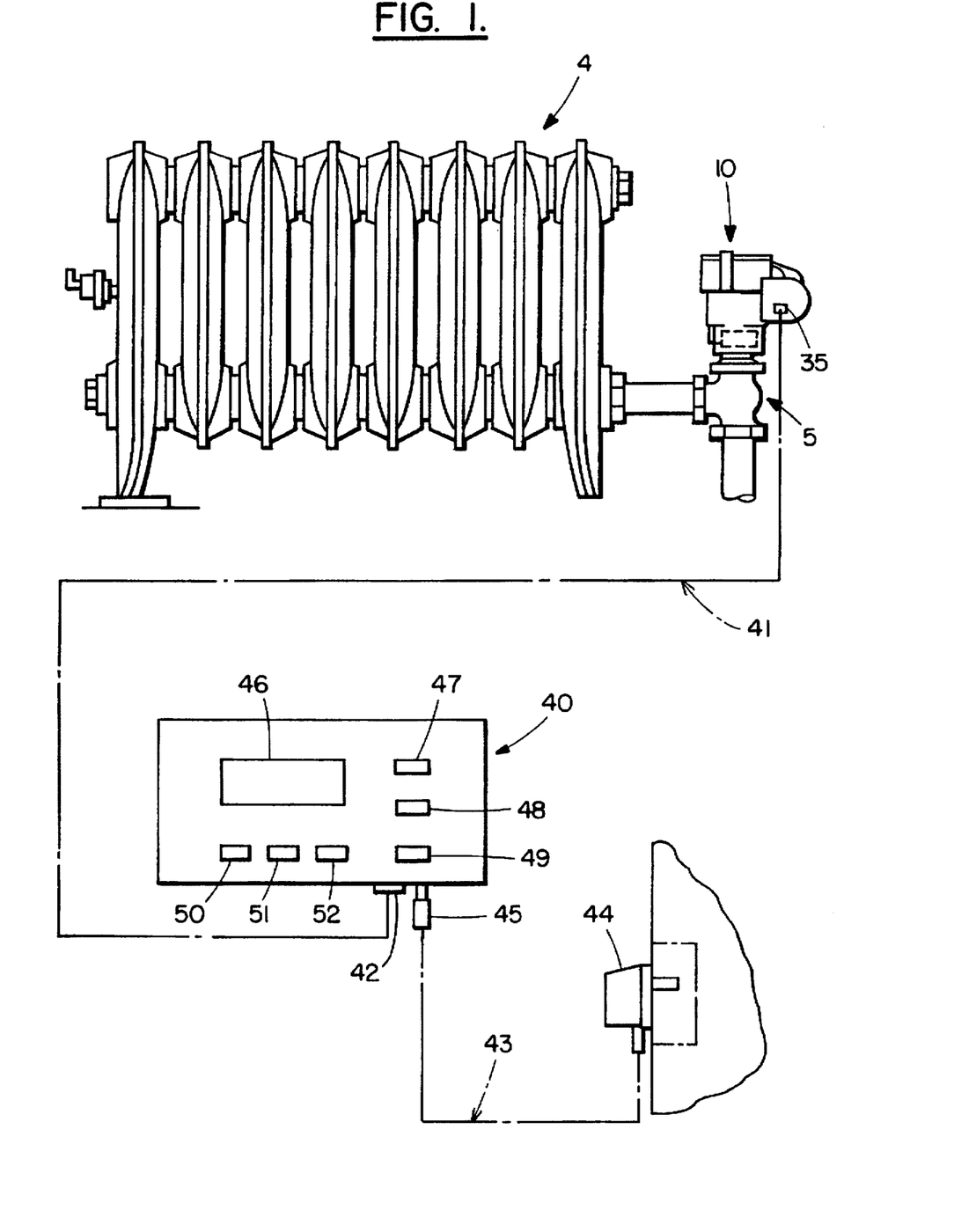
FIG. 1 is a front elevation of a steam radiator with a mounted valve actuator of the present invention and a remote thermostat control box.
Figure 4:
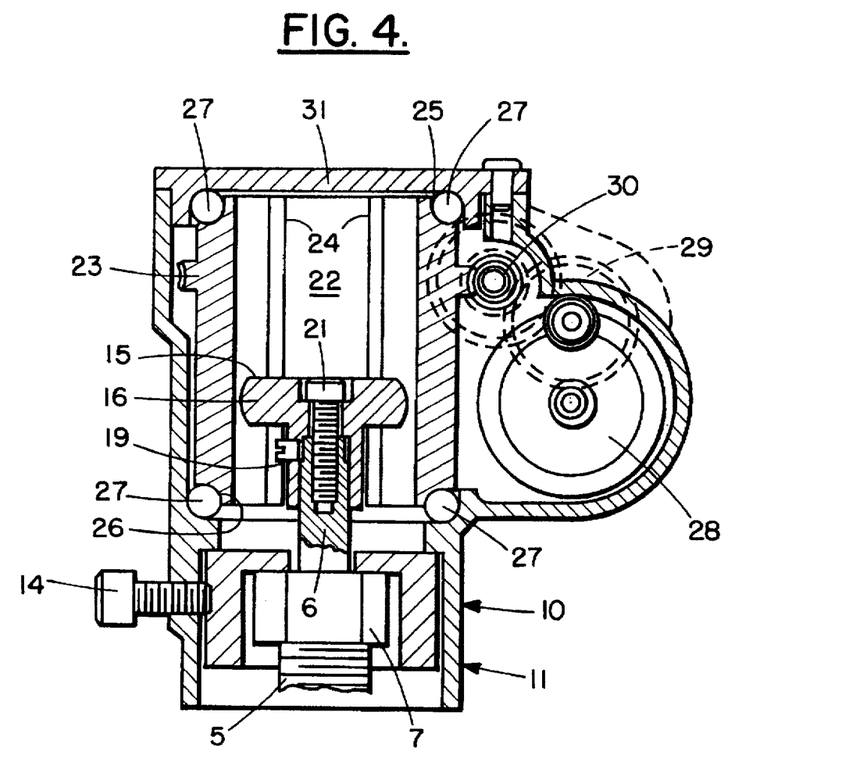
FIG. 4 is a longitudinal section view of FIG. 3 at lines 4—4.
Figure 5:
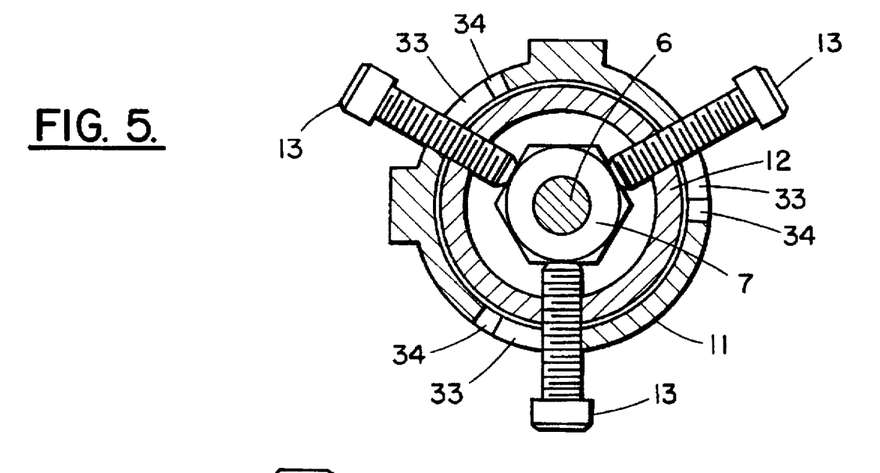
FIG. 5 is a partial section view of the centering cap adapter for the valve bonnet nut substantially taken at lines 5—5 of FIG. 2.
Figure 6:
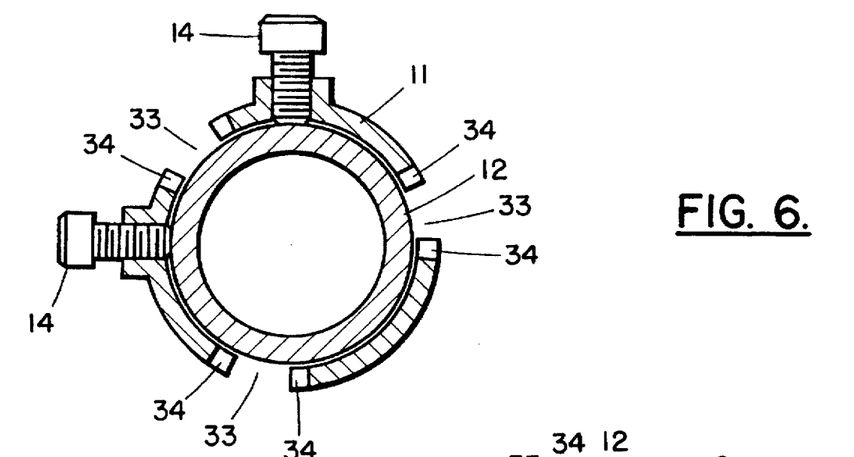
FIG. 6 is a partial section view of FIG. 2 at lines 6—6 with 90° screws from the body of the valve actuator engaged.
Figure 7:
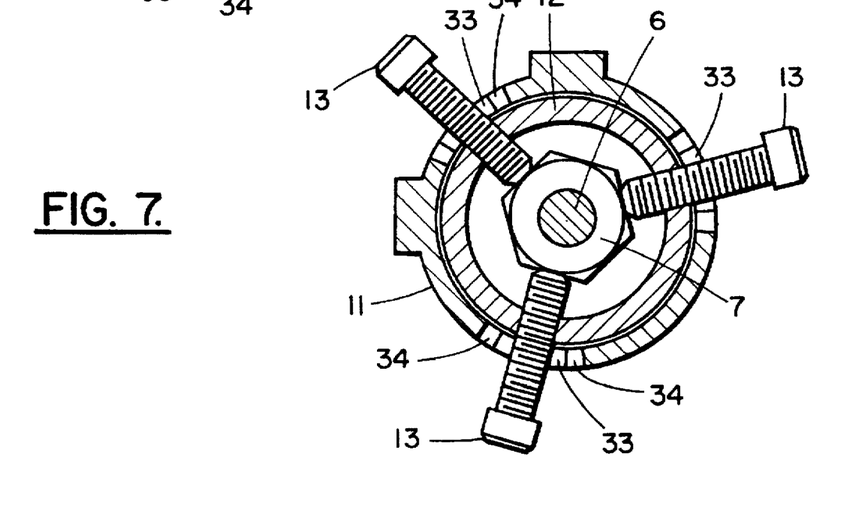
FIG. 7 another view of FIG. 5, with the screws from the centering cap adaptor, rotated to disengagement with the lock notch in the slots in the body.

In FIG. 1, a steam heat radiator 4 is shown with a conventional steam valve 5 having a stem 6, and as can be seen in FIG. 4. The valve 5 has a bonnet nut 7 shown in FIGS. 5 and 7. A valve actuator 10 is mounted on a centering cap 12, mounted on the bonnet nut 7, as can be seen in FIGS. 2, and 4–7. The centering cap 12 is centered and held to the bonnet nut 7 by screws 13.

The thermostat control box 40 in FIG. 1 is connected at the snap fitting 35 of the valve actuator 10 by a cable 41. The cable 41 is also connected to the thermostat control box 40 at another snap fitting 42. A plug-in transformer 44 is connected to the thermostat control box 40 by a power cable 43 and a power connector 45. The thermostat control box 40 has a liquid crystal display 46 and a temperature increase button 47, temperature decrease button 48, an override button 49, time view button 50, hour set button 51 and a minute set button 52.

Figure 2:
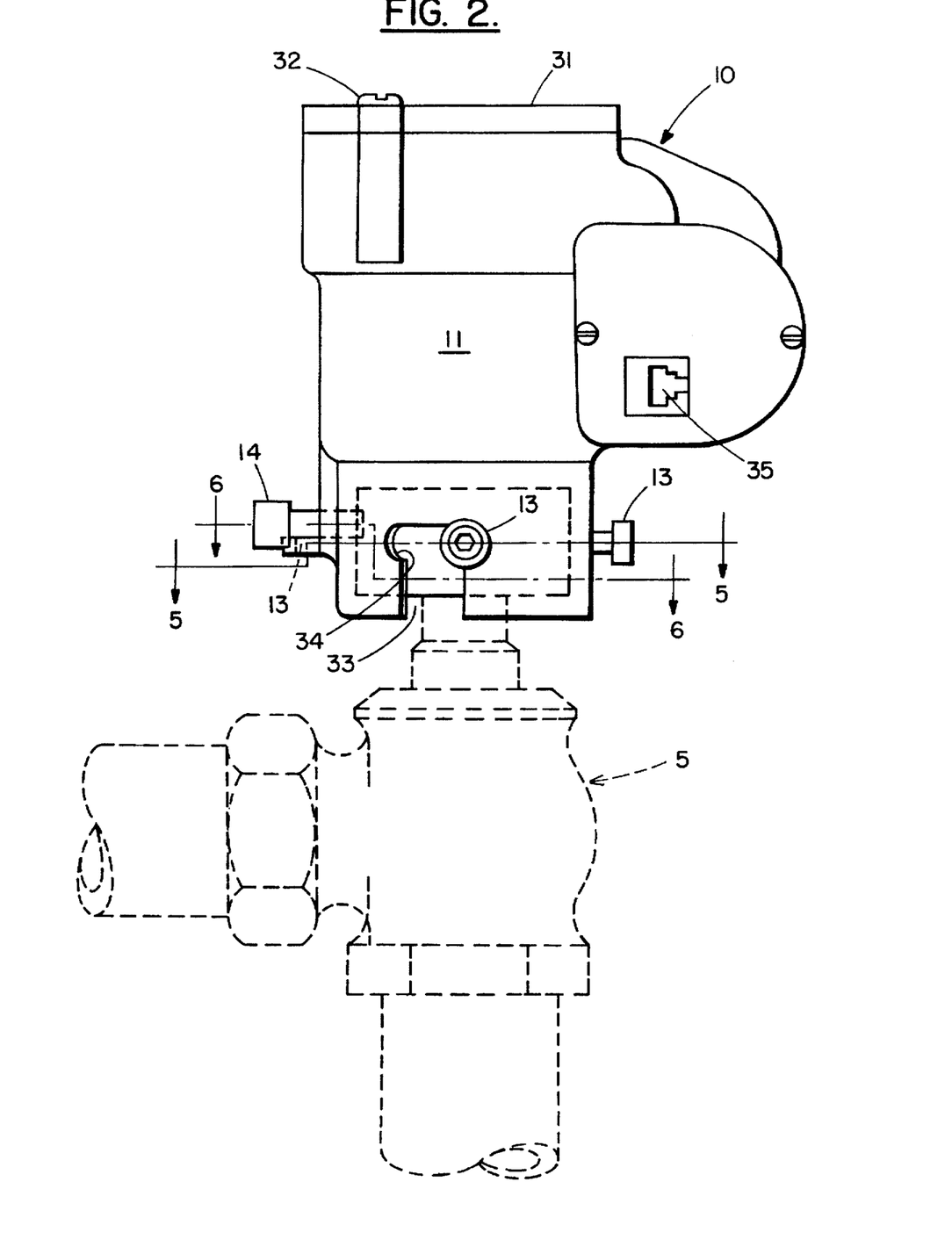
FIG. 2 is a detail front elevation view of FIG. 1 showing the mounted valve actuator.

In FIG. 2, the body 11 of the valve actuator 10 includes openings 33 with lock notches 34. The openings 33 each receive screws 13, which then may be engaged in a lock notch 34, to be held against accidental displacement. Screws 14 through the body 11 engage the centering cap 12 to hold the body 11 of the valve actuator 10 in place, fixed to the centering cap 12.

Figure 10:
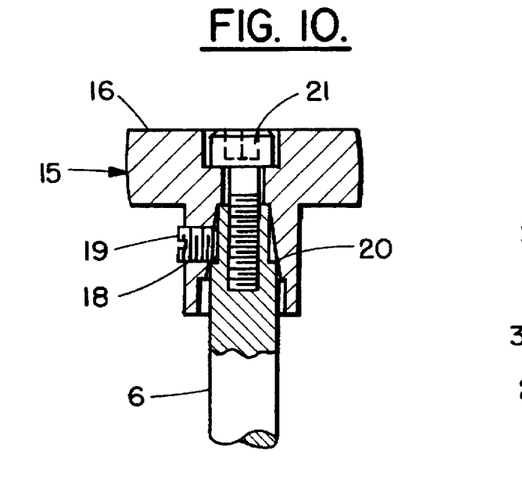
FIG. 10 is the section view of the lug of FIG. 9 on a valve stem held by a screw in the valve stem and by a set screw.

As shown in FIGS. 4 and 10, the stem 6 has a lug 15 mounted on it, held by a screw 21 through an opening 17 in the lug 15, and/or optionally held by a set screw 19 through an opening 18 in the lug 15.

Figure 8:
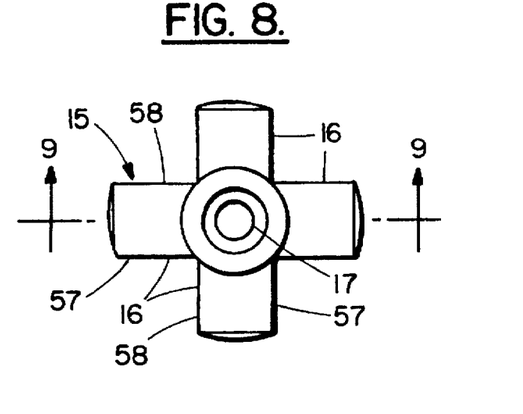
FIG. 8 is a top plan view of a driving lug of the valve adaptor of the present invention.
Figure 9:
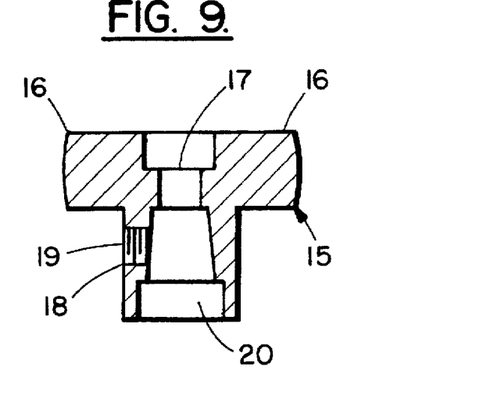
FIG. 9 is a section view of FIG. 8 at lines 9—9 showing the internal taper of the lug.

In FIGS. 8–10, the lug 15 includes cams 16, the opening 17 for the screw 21, the opening 18 for the set screw 19 and a tapered opening 20 to receive the stem 6.

Figure 13:
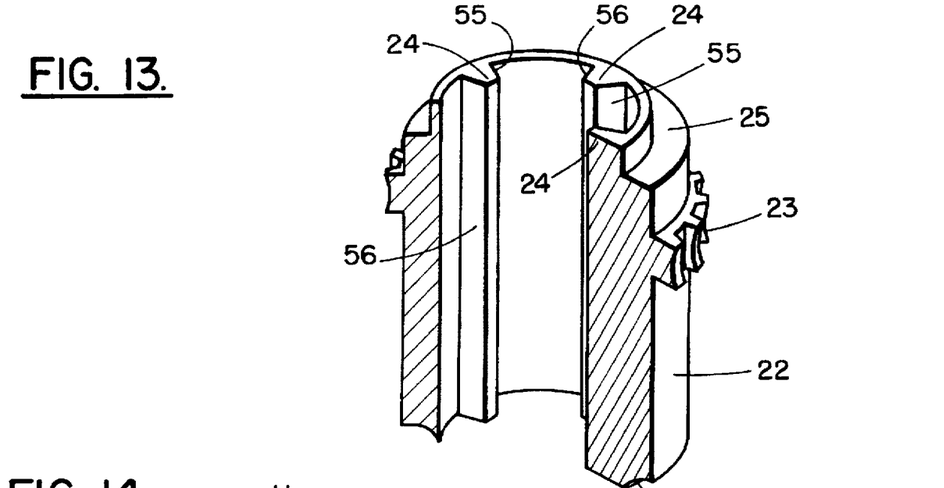
FIG. 13 is a perspective broken away section of the annular gear.

In FIGS. 4 and 13, an annular gear 22 is engaged in the body 11 of the actuator 10. The annular gear 22 has gear teeth 23 in train with a worm drive 30, reduction gears 29 and a motor 28.

Figures 14, 15:
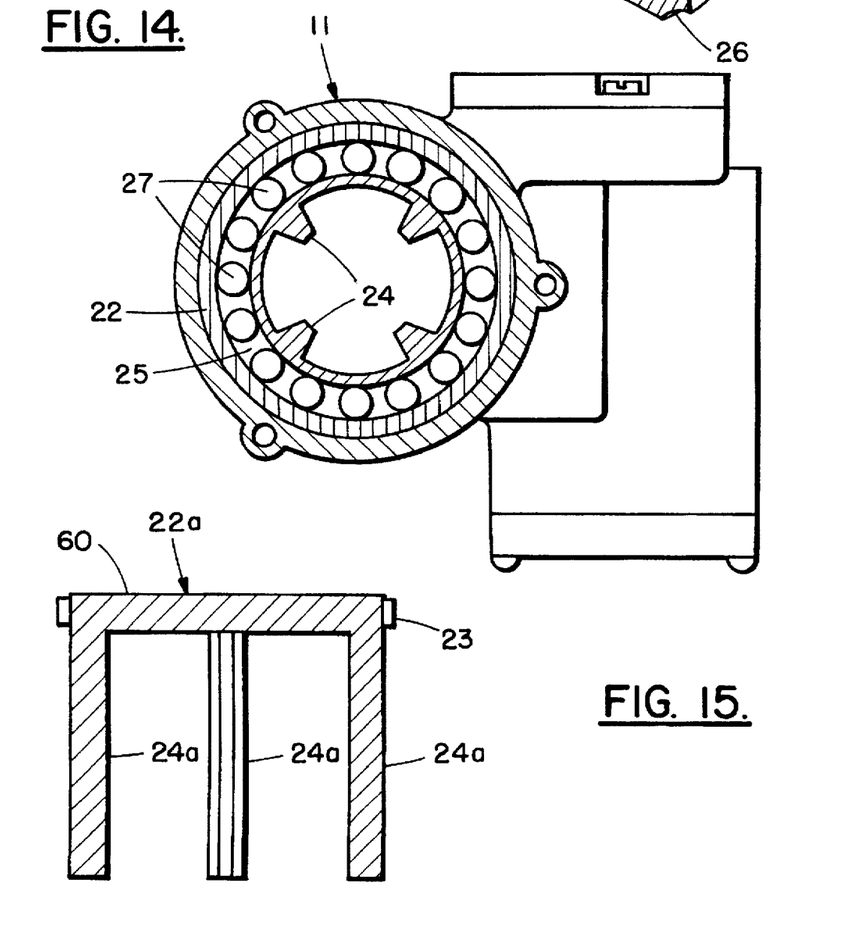
FIG. 14 is a partial section of FIG. 3 showing the annular gear with its upper ball bearings.
FIG. 15 is a front elevation in section of an alternate embodiment of an annular gear for of the present invention.

The annular gear 22 includes an upper ball bearing race 25 and a lower ball bearing race 26. There are cams 24 internal of the annular gear 22 which are longitudinal along its length. In FIGS. 4 and 14, there are ball bearings 27 in the upper ball bearing race 25 and lower ball bearing race 26.

Figure 11:
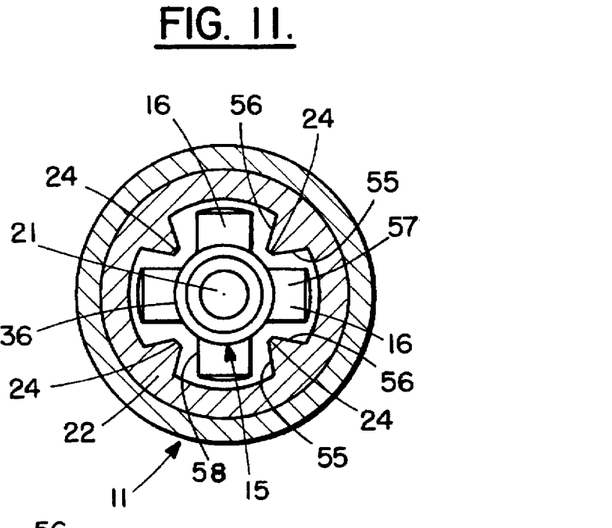
FIG. 11 partial section through the body of the valve actuator shows the lug engaged on the annular gear of the valve actuator held by a screw with a washer.
Figure 12:
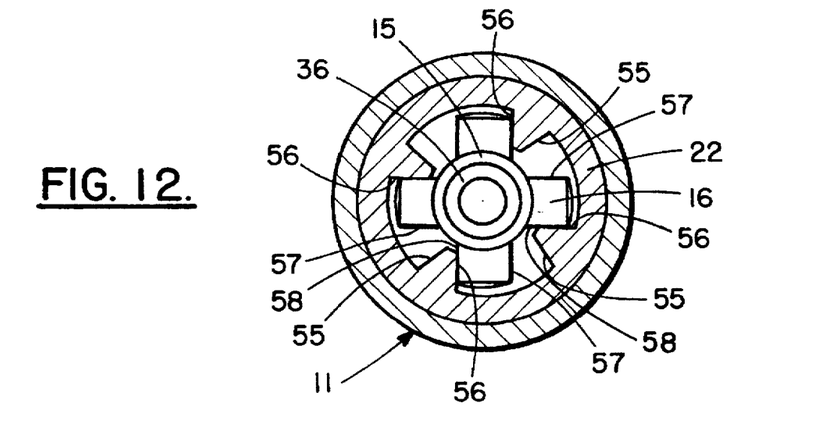
FIG. 12 is section of FIG. 11 showing the lug in driving engagement with the cam of the annular gear of the valve actuator.

In FIGS. 4, 11 and 12, the cams 16 of the lug 15 are engagable with the internal cams 24 of the annular gear 22, when the motor 28 is in train with reduction gears 29 and the worm drive 30 rotates the annular gear 22.

Figure 3:
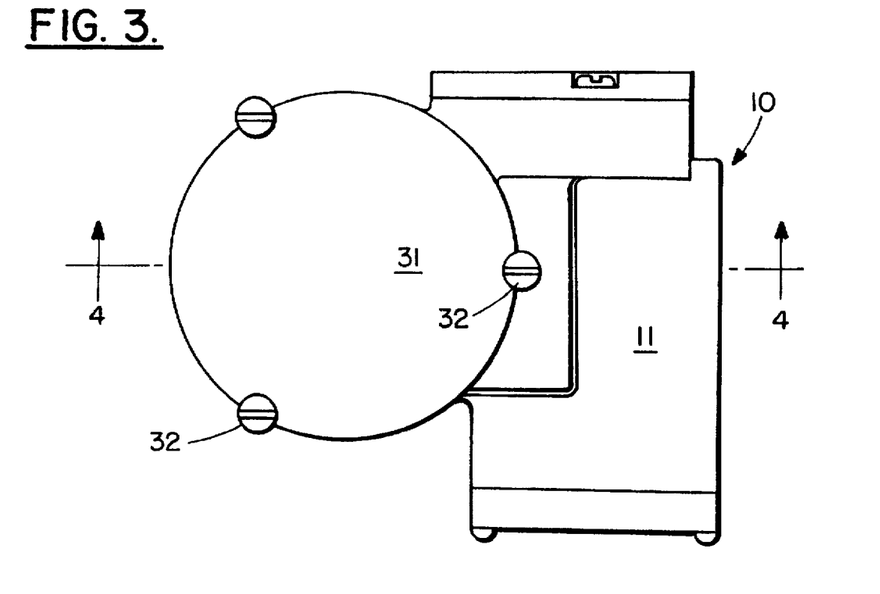
FIG. 3 is a top plan view of the valve actuator as shown in FIG. 2.

In FIGS. 3 and 4, there is a cover 31 on the body 11 for the annular gear 22 which is held in place by screws 32.

FIG. 15 shows an alternate annular gear 22a with gear teeth 23 and a cover 60, from which extends longitudinal cams 24a, engagable with the cams 16 of the lug 15.

Figure 16:
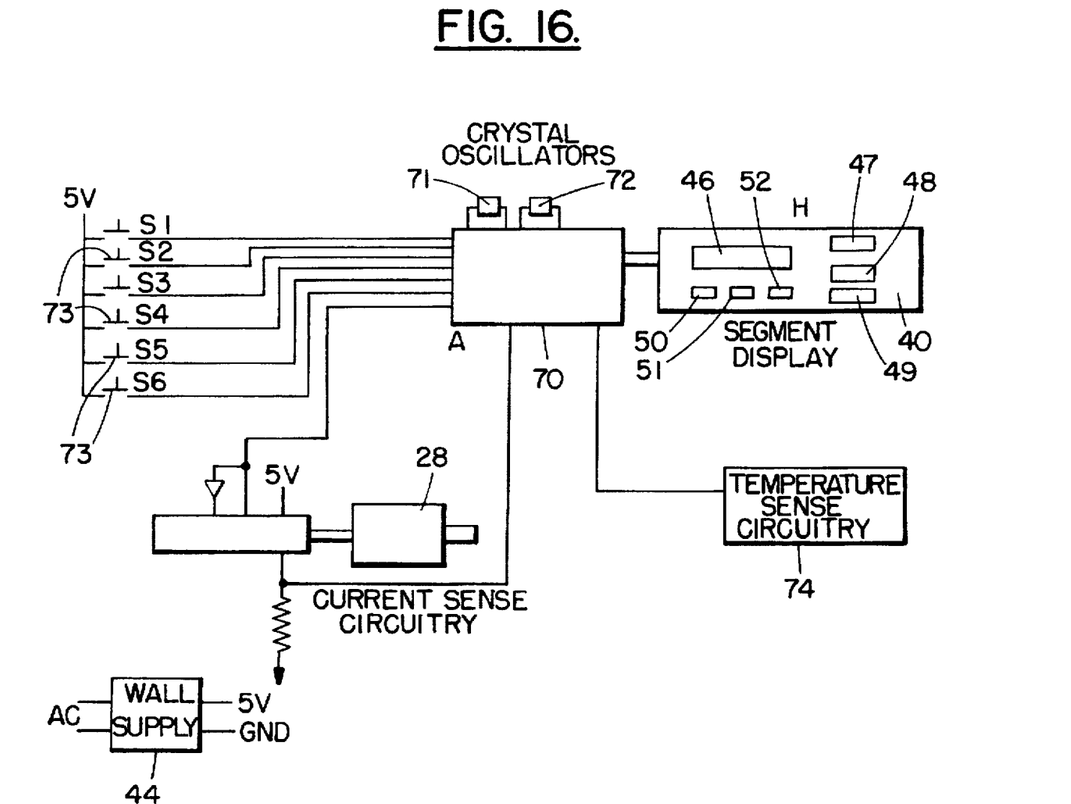
FIG. 16 is a block diagram of the thermostat control box and driver of the valve actuator system.
Figure 17:
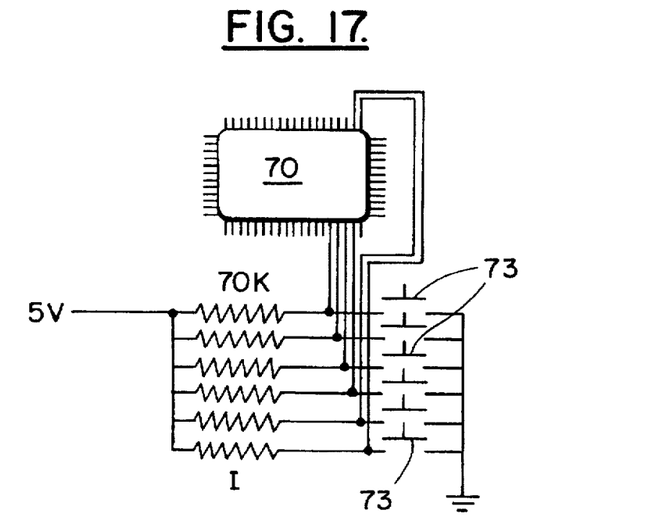
FIG. 17 is a schematic of the switching interface of the thermostat control box setting buttons of FIG. 16.
Figure 18:
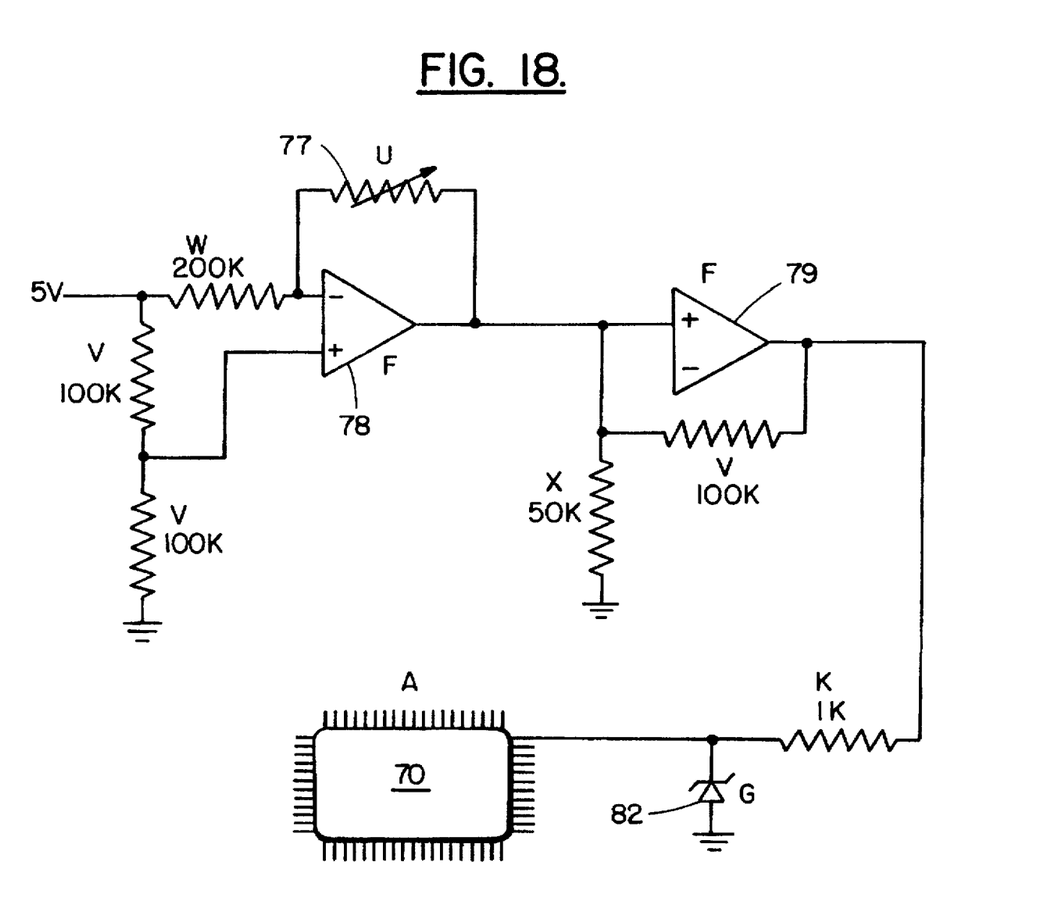
FIG. 18 is a schematic of the temperature sensing circuitry of FIG. 16.
Figure 19:
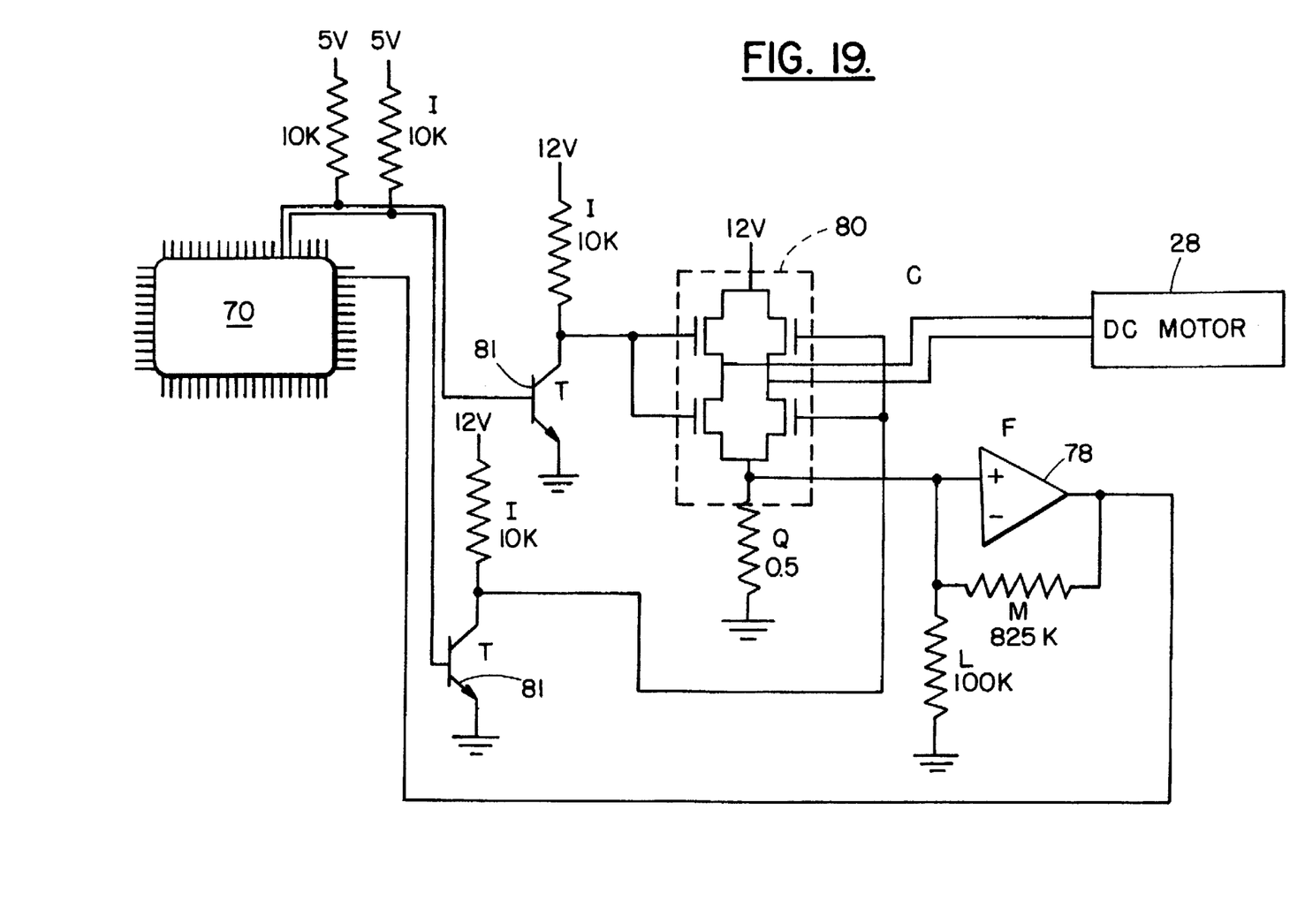
FIG. 19 is a schematic of the motor drive and current sensing circuitry of FIG. 16.
Figure 20:
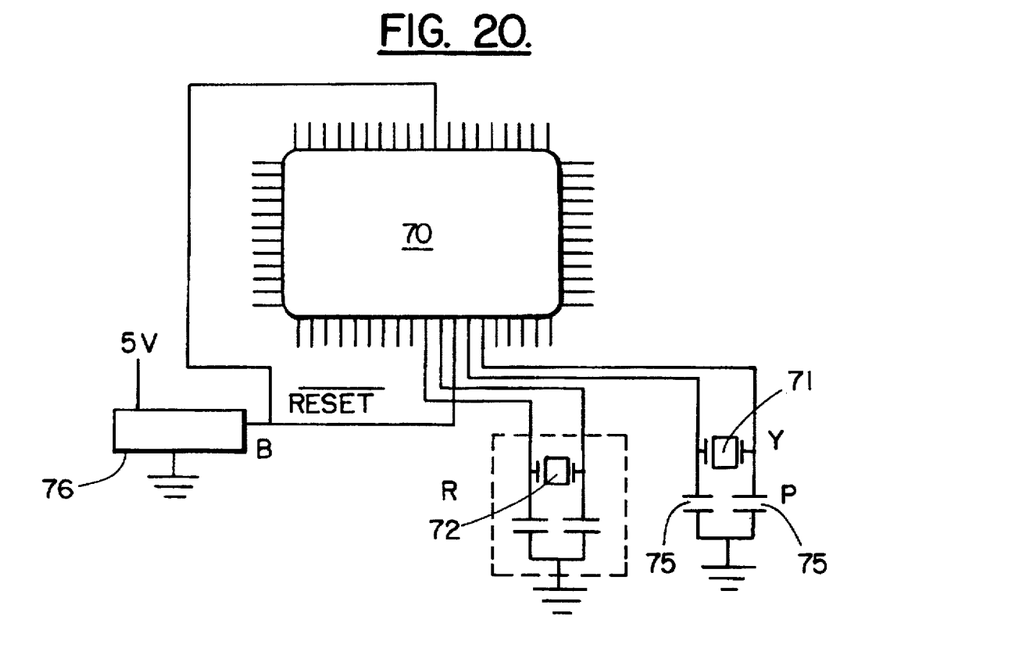
FIG. 20 is a schematic including the watch dog output circuitry of FIG. 16.
Figure 21:
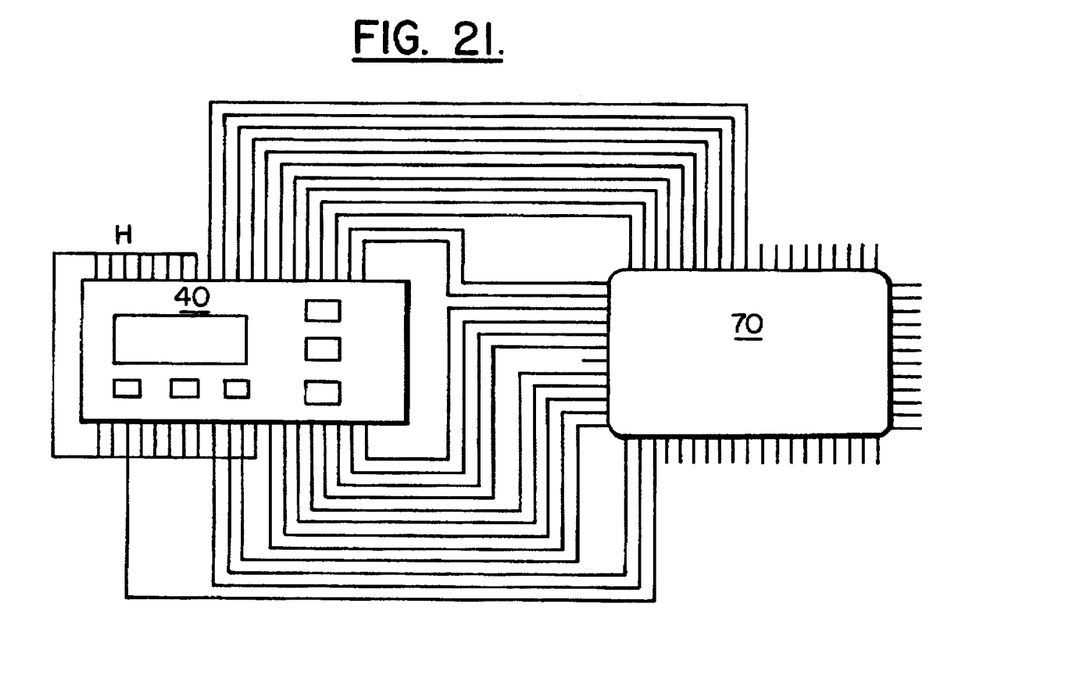
FIG. 21 is a schematic of the liquid crystal display interface circuitry of FIG. 16.

The block diagram of the thermostatic controls and driver of the valve actuator system in FIG. 16, includes a switching interface, shown in FIG. 17, temperature sensing circuitry, shown in FIG. 18, the motor drive and current sensing circuitry, shown in FIG. 19, a watchdog circuit, shown in FIG. 20 and the liquid crystal display control circuitry shown in FIG. 21.

The thermostat control box 40, in FIG. 16, has a micro controller chip 70, a crystal oscillator 71, connected to two pins and a second crystal oscillator 72, as shown in greater detail in FIG. 20. The switches 73 for the thermostat control box 40 set buttons 47–49, 50–52, are shown in detail in FIG. 17, interfaced with the micro controller chip 70. The liquid crystal display 46 interface with the micro controller chip 70 is shown in detail in FIG. 21. The temperature sensing circuitry 74, of FIG. 16, is shown in detail in FIG. 18. The circuitry for driving the motor 28 and current sensing circuitry are shown in detail in FIG. 19.

The software in micro controller chip 70 includes debounce circuitry to protect against multiple pressing of the set buttons 47–49, 50–52. In FIG. 20, the crystal oscillator 71 times some of the micro controller chip's 70 functions and the crystal oscillator 72 is the master drive of the micro controller chip 70. The micro controller chip 70, is for instance, a TOSHIBA™ TMP47C446VF microcontroller mask program. The crystal oscillator 71 is, for example, a STANDARD™ 32.768 Khz and crystal oscillator 72 is, for example, a PANASONIC™ EFO-V4004E54Mhz ceramic resonator with a two capacitors 75 in parallel. The capacitors 75 are, for example, a PANASONIC™ ECU-V1H150JCN 15pf, 50v ceramic capacitor 0805 smd.

There is a watchdog output for the micro controller chip 70 from a grounded micro processor supervisor 76 which is, for example, a DALLAS™ 12332-10 chip.

The temperature sensing circuitry 74, in FIG. 18, is basically a constant current source, to get a voltage from the thermistor 77 and provides one stage of gain to amplify the voltage, before it goes into an analog to digital converter in micro controller chip 70. The thermistor 77 is an interchangable 100 k ohm thermistor. The input signal is fed back from the thermistor 77 through an amplifier 78 through another amplifier 79 and into the micro controller chip 70. Between the micro controller chip 70 and the amplifier 79 is a resistor and a zener diode 82 to ground. The amplifiers 78, 79, are for example, a NATIONAL™ LM324 quad chip. The zener diode 82 is, for example, a ZETEX™ 5.1 volt sot 23.

The motor drive and current sensing circuitry 74 are shown in FIG. 19. There is an H bridge driver 80 with two sets of transistors 81, connected in such a way, that they can bring either of the outputs from the motor 28 to positive or ground. In this way, the motor 28 can be reversed, or if both of its inputs are the same polarity, turned off. The transistors 81 are, for example, PHILLIPS™ NPN bipolar switches, 40 v, 150 ma sot 23. The H bridge driver 80 is, for example, a MOTOROLA™ MMDFC05E H-Bridge driver IC.

There is a night time override feature in the software of the micro controller chip 70 which forces the system to control the daytime setpoint instead of the lower night time set point.

Operation

The Actuator

The valve actuator 10 of the present invention is a universal retrofit that enables its installation on existing stems 6 of existing valves 5 of the prior art. When a valve 5 is in a steam heating system, no special preparation need be made for installation. The valve actuator 10 need only be installed and the valve actuator 10 connected to the thermostat control box 40.

Old standing valves 5 in old steam heating systems may be bent, or even twisted. The valve actuator 10 of the present invention works well on almost any valve 5, stem 6, no matter what its condition. The valve handle (not shown) must be generally removed for the valve actuator 10 to be installed. Without a valve handle, the stem 6, as shown in FIGS. 4 and 10 usually has a tapered square end to accommodate the valve handle. The stem 6 oftentimes has an opening for a screw to engage the valve handle.

The lug 15, as shown in FIGS. 4 and 8–12, is provided with a tapered opening 20 and an opening 17 for a screw 21. The tapered opening 20 accommodates the wide variety of diameters of the stems 6 to make the lug 15 a universal retrofit. The screw 21 preferably has an allen head. As shown in FIG. 11, the screw 21 is engaged with an interposed washer 36.

As can be seen in FIGS. 4 and 10, the lug 15 can be independently held to the stem 6, with the screw 21, or held independently or in conjunction with the set screw 19. The lug 15 is thus, also adapted to attach to a stem 6 that has a threaded end or non threaded end.

The annular gear 22, as shown in FIGS. 4 and 11–14, has inner cams 24 and outer gear teeth 23. The annular gear 22 is driven by the motor 28 in train with the reduction gears 29 and the worm drive 30.

The cams 24 are widely spaced apart beyond the width of the cams 16 of the lug 15 and extend inward beyond the length of the cams 16. The cams 16 are narrower than the spacing between the cams 24 and shorter than the distance to the inner wall of the annular gear 22. Thus the cams 16 are engagable with the cams 24 when the annular gear 22 is rotated. There a is large play between the cams 16 and the cams 24 enabling full engagement during rotation, even under eccentric rotation of the lug 15 engaged on a distorted stem 6 of a valve 5. The configuration of the lug 15 and the annular gear 22 enable the universality of the retrofit of the valve actuator 10 of the present invention.

The cam 24 of the annular gear 22 has a first driving surface 55 and a second driving surface 56. The cam 16 of the lug 15 has a first driven surface 57 and a second driven surface 58. The first surfaces 55 and 57 of the cam 24 and the lug 15 are engagable to rotate the lug 15 in one direction. The second surfaces 56 and 58 of the cam 24 and the lug 15 are engagable to rotate the lug 15 in a reverse direction. The width of the cam 16 is less than the spacing between the cams 24. The spacing difference provides a play that maintains a gear engagement even during eccentric rotation.

The cams 24, 24a must extend a substantial linear distance in the annular gears 22 and 22a. The lengths of the cams 24, 24a allow a parameter for a selection of stem lengths of prior art valves 5.

The diameter of the annular gears 22 and 22a must be sufficient to permit the eccentric rotation of a bent or twisted stem 6 of a valve 5 with a lug 15 mounted. The diameter must allow for a parameter of overlap of the cam 16 of the lug 15 and the cams 24, 24a so that there is engagement therebetween and yet play to account for the eccentric movement.

The lower ball bearing race 26 and upper ball bearing race 25 with the ball bearings 27 enable the annular gear 22 to rotate easily in the body 11 of the valve actuator 10 with little need for maintenance. The ball bearings 27 may even be of a plastic such as nylon, or could be a brass or plastic sleeve bearing.

The valve actuator 10, to properly function, must be engaged in a fixed position with relation to the valve 5. As shown in FIGS. 4 through 7, a centering cap 12 is affixed to the bonnet nut 7 by screws 13. Once done, the lug 15 may be affixed on the stem 6 and the body 11 of the valve actuator 10 slid over the centering cap 12. The screws 13 are then engaged in the openings 33 in the body 11 and engagable lock notch 34 in the opening 33 as a safety catch. Once screws 14 are tightened on to the centering cap 12 the valve actuator 10 can operate the stem 6 of the valve 5.

The Thermostat

The operation of the thermostat control box 40 is controlled by the micro controller chip 70. The micro controller chip 70 is a TOSHIBA™ TMP47C446VF with burned in programmed software or a programmed TOSHIBA™ TMP47C446AF which periodically measure the temperature, comparing it to the set point and opens or closes valve 5, or multiple valves 5, if more than one is included in the system. Each valve 5 is moved no more than once every five minutes. As the motor 28 for valve 5 begins to drive in the open or closed direction, its power consumption is monitored by the micro controller chip 70 software. During a move, the motor 28 is started with a current threshold which is significantly higher than the operating current. This is done in case the valve 5 is somewhat stuck. After one half a revolution, the current threshold is lowered by the software in an effort to accurately achieve the alternative valve 5 position and prevent it from becoming jammed. The motor 28 runs indefinitely if the current threshold is not achieved, thus alerting the user that there has been a mechanical failure.

More than one actuator 10 may operate from micro controller chip 70 software in the thermostat control box 40.

The measured temperature is constantly displayed during normal operation in the liquid crystal display 46. The time of day set at the thermostat control box 40 determines whether it is in day mode or night mode. The mode determines whether the temperature is at the entered daytime set point, or the daytime set point minus thirteen, which is used to control the room temperature. It is during night mode that the control point consists of the daytime set point minus thirteen, or 55° F., whichever is greater. During the night mode, the symbol "O" should appear to the left of the displayed measured temperature in the liquid crystal display 46. During day mode or night mode override, the "O" disappears. Day mode occurs when the time is between 6:00 AM and 10:00 PM, or night time override has been set. Any other time is considered night mode, provided that night time override has not been set. The night time override button 49 sets the day mode for two to four hours. The remaining override time splayed when the override button 49 is pressed. Holding the button 49 continues to add two hours to the remaining time up to a maximum of four hours. During day mode, pressing the override button 49 produces a"----" on the display to indicate that the temperature is already controlled according to the daytime set point.

Pressing the time display view button 50 displays the time. Pressing the hour set button 51 displays the hours and then begins to advance the hours. The time increments at the rate of one per second and then increases to one and one half per second after two increments. To the right of the hours is displayed "A" or "P" to indicate AM or PM. The minute set button 52 works similarly. The maximum an minimum temperature set points, which can be set, are 85° F. to 55° F. respectively. Shortly after any of these buttons have been pressed, the measured temperature is compared with the control set point.

If necessary, the valve 5 is then moved. If the valve 5 has not been moved in the twenty four hour period preceding midnight, the valve 5 is moved through one complete open, or open-close, or close-open-close cycle, depending upon the present state of the valve 5. The valve 5 is then considered moved for a new twenty four hour period. Thus, the valve 5 will be, at most cycled, once every other day when it is inactive during normal operation. The valve 5 is cycled in this way to keep the valve 5 rotating freely during periods of inactivity.

The thermostat control box 40 is plugged in, as shown in FIG. 1, with the plug-in transformer 44 at an outlet. The thermostat control box 40 software in the micro controller chip 70 determines the position of the valve 5 by attempting to drive a valve 5 to the open position. If it is unable to turn more than a half turn, it immediately begins to close the valve 5, thus ascertaining a known position for the valve 5. Once the valve's 5 position has been determined, the liquid crystal display 46 flashes "12:00". Next, the unit may open or close the valve 5, based on the default set point of 70° F., the measured temperature and the present position of the valve 5. During such time, the display 46 stops flashing, but continues to display "12:00". When this move is complete, the display 46 continues to flash until the hour or minutes set buttons 52 are pressed.

As shown in FIG. 20 a microprocessor supervisor 76 is in circuit with the micro controller chip 70 so that the software resets the micro controller chip 70 in a watchdog output to protect the micro controller chip 70 against responding to undesired intermediate signals.

As shown in FIG. 18 the zener diode 82 protects the micro controller chip 70 from being burned out from a current overload.

As shown in FIG. 19 the H bridge driver 80 acts as an ammeter and senses the increased current as the valve 5 reaches the open or closing extremes of movement. The software of the micro controller chip 70 is programmed to cycle the valve to remain open or closed depending, on the setting of the temperature at the thermostat control box 40 actuated by the current surges, as the valve 5 is turned to its extreme open or extreme closed position.

The H bridge driver 80 is a solid state toggle for a DC motor 28 which is bidirectional. The shaft of the motor 28 revolves clockwise or counterclockwise depending on the polarity of the current. The H bridge driver 80 is the functional equivalent of exchanging leads. The DC motor 28 draws variable amounts of current, depending upon the load. During the active cycle the software of the micro controller chip 70 monitors the current as an ammeter circuit would. The software polls at approximately 100 time per second. When the stem 6 of the valve 5 reaches the end of travel in either direction the load and consequently the current rises signaling the software to begin the end of cycle processing.

The circuitry of the H bridge driver 80 includes two sets of transistors wired back to back. The microprocessor outputs to the gates of each transistor pair and controls which transistor of each pair is conducting. The signal from the microprocessor is sent first through a bipolar transistor T to change it from a 0–5 volt signal to a 0–12 volt signal. When the input to a transistor pair of the H bridge driver 80 is high (12 v), the upper transistor is off (open circuit) and the lower one is on (shorted to ground). Consequently, the output of the H bridge driver 80 corresponding to this transistor pair and is grounded an so is the motor lead connected to this output. At the same time, when the input to a transistor pair is at ground (0 v), the upper transistor is on (closed circuit) and the lower one is off (open circuit). Under this circumstance, the output which corresponds to this transistor pair is at 12 volts. If both outputs from the H bridge driver 80 are at ground or both are at 12 volts then the motor 28 will be off. If one output is high and the other low, the motor 28 will spin in one direction. If the same outputs are reversed (the high brought low and the low brought high), the motor 28 will spin in the opposite direction.

The controlling arrangement with the H bridge driver 80 enables the system of the present invention to control the valve actuator 10 to effectively open or close valves 5 an arbitrary wide range of total travel distances, open to close, turns per inch, number of turns open to close completely opening or closing the valve 5. In a steam heat system this is essential in order to have effective control.

The system of the present invention can be used to remotely actuate valves in other than a steam heat system also. The cams 24a of the annular gear 22a as shown in FIG. 15, extending from the cover 60 are engagable with the cams 16 of the lug 15.

As shown in FIG. 1, the cable 41 is connected to the thermostat control box 40 in snap fitting 35, which is a telephone wire RJ 11 or RJ 45, depending on the number of wires desired. The snap fitting 42 in the thermostat control box 40 is also an RJ 11 or RJ 45. The power connector 45 for the system plugs into the thermostat control box 0 from a cable 43 running from the plug-in transformer 44 plugged into a standard 120 VAC outlet.

An advantage of the present invention over the prior art is that the cable 41 to the valve actuator 10 snap fitting 35 is a low voltage line. Thus there is not the danger of a long 120VAC line to the thermostat control box 40 that can shock or be damaged.

The mode of actuating the valve actuator 10 could also be a remote signal to a sensor such an, infra red, ultra violet, ultra sonic or even sonic. It is important that the thermostat control box 40 be remote from the radiator 4 and/or the valve 5 since the heat from the radiator 4 or the valve 5 can distort the temperature regulating function of the system of the present invention. A remote thermostat control box 40 can be placed where can best respond to the desired temperature in the room.

The cable 43 has the same safety advantage as the cable 41. The cable 41 is a low voltage line from the plug-in transformer 44. The plug-in transformer 44 steps down the 120VAC current to the desired low voltage DC current of the system of the present invention.

The voltages can be selected to the needs of the chips and the motor 28. The usual operating voltages are 5 volt or 12 volts DC or a mix thereof in the system. These voltages enable the use of off the shelf components to allow great cost efficiency in the assembly of the system. The snap fitting 35 and snap fitting 42 are in the form of an RJ11 or RJ45 and the simple power connector 45 allows easy unskilled installation of the connection of the present invention.

The cable 43 and power connector 45 may also be in the form of a telephone handset cord with RJ11 connectors (not shown) plugged directly into a plug in transformer 44 and the thermostat control box 40. Such a configuration maximizes simplicity of installation and electrical safety. The circuitry using the RJ11 power cord is integratable with the use of RJ45 connectors for the snap fitting 35 and snap fitting 42.

The terms and expressions which are employed are used as terms of description; it is recognized, though, that various modifications are possible.

It is also understood the following claims are intended to cover all of the generic and specific features of the invention herein described, and all statements of the scope of the invention which, as a matter of language, might fall therebetween.

Having described certain forms of the invention in some detail, what is claimed is:

1. A valve actuator in a system for driving a valve stem to open or close a valve, said actuator being anchorable in a fixed position with regard to the valve opposed to the valve stem, said actuator including a drive gear, means to drive said drive gear, said drive gear being rotatable and including at least one elongated drive cam having a first driving surface and a second driving surface, a lug including at least one drive cam having a first driven surface and a second driven surface, said lug being mounted on the valve stem for rotation therewith, said drive cam being engagable with said driven cam when said actuator is anchored in fixed position opposed to said lug, said first surfaces of said drive cam and of said driven cam being engagable to rotate said lug in one direction, said second surfaces of said drive cam and of said driven cam being engagable to rotate said lug in another direction, and all said respective surfaces of said drive cam and said driven cam being spaced apart from each other when not engaged, whereby there is play between all said surfaces, said actuator including a bottom portion open to the valve stem, said bottom portion having a periphery with at least one slotted opening having a lock notch for selective stationary mounting of said actuator on the valve.

2. The invention of claim 1 wherein said means to drive said drive gear is an electric motor.

3. The invention of claim 2 wherein said means to drive said drive gear includes a motor and a gear train including reduction gears and a worm gear engaged with said drive gear and driven by said motor.

4. The invention of claim 1 wherein said drive gear is cylindrical including peripheral teeth.

5. The invention of claim 4 wherein said drive cam is internal of said cylinder.

6. The invention of claim 5 wherein said drive cam extends longitudinally substantially the length of said cylinder.

7. The invention of claim 6 wherein said drive gear includes at least one ball bearing race and ball bearings in said ball bearing race.

8. The invention of claim 1 wherein said lug includes a central opening therethrough, said central opening to receive screw means to fix said lug to rotate with the valve stem.

9. The invention of claim 1 wherein said lug includes a central opening at least partially therethrough to engage the valve stem therein.

10. The invention of claim 9 including:
a set screw, said lug having a further opening therethrough to the central opening, the further opening to receive said set screw to fix said lug to rotate with the valve stem.

11. The invention of claim 9 wherein the central opening is tapered.

12. The invention of claim 1 including a system for driving said drive gear, said system including a system for operating a DC electric motor including said motor, said motor engagable to drive said drive gear, means to energize said motor, said motor having an on and off state, said motor operable forward or backward, said operating system including integrated circuitry, means to energize said circuitry, said integrated circuitry including; temperature sensing means; and motor current measuring means, said temperature sensing means including at least one set point, said at least one set point settable to a selected temperature reading, said temperature sensing means including actuating means to change said motor's state when the temperature of the environment in which the system is located reaches said selected temperature reading of said set point, said motor current measuring means including a set point, said set point above a threshold of normal operating current representing a current surge point indicative of a sudden increased load, said current measuring means including means to change said motor to an off state when said current reaches said current set point and to also reverse the polarity of current to said motor, and said polarity reversal sequenced to change with said off state or to change before the next said on state.

13. The invention of claim 12 including a housing, said housing containing said integrated circuitry, a display window, said display window to display, at least time information and temperature information, control buttons to at least adjust time in said circuitry and temperature settings, means to interface said integrated circuitry with said display window, means to interface said control buttons with said integrated circuitry, and means to interface said control buttons with said display window.

14. A valve actuating system for operating a valve having stationary structure and a stem rotatable thereon for opening and closing the valve and from which a manually operable valve handle has been removed, said system comprising:
a body adapted to be mounted on the stationary structure of the valve;
lug means mounted on the stem and including first cam means;
annular gear means rotatably mounted on said body and including second cam means engageable with said first cam means;
mounting means for releasably fixing said body on the stationary structure of the valve, said mounting means including:
a centering cap overlying the stationary structure;
an integral annular skirt encompassing the stationary structure; and
a plurality of first screw fastener threadedly engaged with said annular skirt at circumferentially spaced locations and extending to terminal ends with the stationary structure; and
drive means on said body operably engaged with said annular gear means for rotating said annular gear means;
whereby, with rotation of said annular gear means, said second cam means engages said first cam means to rotate the stem of the valve.

15. A valve actuating system as set forth in claim 14 wherein said body is at least partially cylindrical; and wherein said mounting means includes:
a plurality of second screw fasteners threadedly engaged with said body at circumferentially spaced locations and extending to terminal ends engageable with said annular skirt.

16. A valve actuating system as set forth in claim 14 wherein said lug means includes:
a hub having a central opening for engageably receiving the stem therein;
screw means for attaching said hub to the stem; and
a plurality of lug arms extending radially away from said hub at circumferentially spaced locations thereon, each of said lug arms having first and second opposed cam surfaces thereon.

17. A valve actuating system as set forth in claim 14 wherein said annular gear means includes:

a cylindrical sleeve member having an outer peripheral surface and an integral annular gear projecting away from said outer peripheral surface and lying substantially in a plane perpendicular to a longitudinal axis of said sleeve member, said cylindrical sleeve member having an inner peripheral surface, said second cam means including a plurality of circumferentially spaced, longitudinally extending, cam members projecting away from said inner peripheral surface; and bearing means rotatably mounting said sleeve member on said body such that the longitudinal axis of said sleeve member is substantially aligned with that of the valve stem.

18. A valve actuating system as set forth in claim 17 wherein said drive means includes:

a drive motor;

a worm gear drivingly engaged with said annular gear; and a gear train operably connecting said drive motor and said worm gear.

* * * * *